United States Patent [19]
Stanton et al.

[11] Patent Number: 5,229,220
[45] Date of Patent: Jul. 20, 1993

[54] REVERSE POLARITY PROTECTION ASSEMBLY

[75] Inventors: Stephen M. Stanton, Lauderhill; Rudy Yorio, Boca Raton; Jose Villanueva, III, Delray Beach; Jill C. Olkoski, Ft. Lauderdale; Danielle P. Dzung, Plantation, all of Fla.

[73] Assignee: Motorola, Inc., Schaumburg, Ill.

[21] Appl. No.: 863,557

[22] Filed: Dec. 12, 1991

[51] Int. Cl.$^5$ .............................. H01M 2/10
[52] U.S. Cl. ................................. 429/1; 429/100
[58] Field of Search .................. 429/1, 99, 100; 439/677, 680

[56] References Cited

U.S. PATENT DOCUMENTS

| | | | |
|---|---|---|---|
| 4,414,298 | 11/1983 | Krenz | 429/1 X |
| 4,468,439 | 8/1984 | Ohara et al. | 429/1 |
| 4,690,878 | 9/1987 | Nakamura | 429/1 |
| 4,737,420 | 4/1988 | Ikeda et al. | 429/1 |
| 5,024,605 | 6/1991 | Kasatani et al. | 429/99 X |
| 5,116,699 | 5/1992 | Miyajima | 429/100 |

*Primary Examiner*—Stephen Kalafut
*Attorney, Agent, or Firm*—Pablo Meles; William E. Koch; Thomas G. Berry

[57] ABSTRACT

A reverse polarity protection assembly (40) comprises an electronic product housing (102) having a battery compartment (90) having a recessed positive contact (70) and recessed negative contact (80). The assembly further comprises a battery holder (44) carried within the battery compartment (90). The battery holder has a plurality of leaf spring contacts (54) biased towards each other at opposing ends of the battery holder, the battery holder having external battery contacts (56 and 58) to contact the recessed positive and negative contacts. The assembly finally comprises a plurality of non-conductive spacers (10) carried by at least some of the leaf spring contacts, each of the spacers have an aperture (7) allowing a protruding terminal (43) of a battery (42) to contact the leaf spring contact and preventing a flat terminal (45) of a battery from contacting the leaf spring contact.

16 Claims, 3 Drawing Sheets

1

REVERSE POLARITY PROTECTION ASSEMBLY

TECHNICAL FIELD

This invention relates generally to battery contact assemblies and, more particularly, to a reverse polarity protection assembly for battery contacts.

BACKGROUND

Many consumer electronic products are susceptible to damage when the user places a battery or battery holder in the battery compartment of the electronic product in reverse polarity. Therefore, many electronic devices come with either a mechanical or electronic protection scheme to either prevent the insertion of a battery in the reverse polarity or to prevent the effects of reverse polarity. If the reverse polarity protection is done electronically, the circuits used to provide this protection may take up valuable circuit board space in the electronic product. Furthermore, a reverse polarity circuit may cause greater power drain on the batteries in order to operate the protective circuit.

In addition to the effects of reverse polarity, many electronic products will not function properly if there exists intermittency between cells, batteries and contacts in the product. Battery packs and holders for portable electronic products are typically subjected to a repeated number of drops. In particular, users of portable communication products such as two-way radios, cordless telephones, and cellular phones tend to drop their portable products, causing the problem of intercell contact intermittency. This temporary loss of power due to a broken connection causes unpredictable device operation, or in the case of a device with volatile memory circuits, a total loss of the memory's contents. This problem could potentially cause the loss of communications and/or other functions in other portable electronic products as well. Therefore, there exists a need to provide a mechanical device for use with electronic products such as radios and telephones that would not only provide reverse polarity protection, but provide protection against contact bounce or intermittency.

SUMMARY OF THE INVENTION

A battery contact for an electronic product having reverse polarity protection for preventing the improper insertion of a battery comprises a leaf spring contact for engaging a protruding terminal of the battery and a non-conductive spacer carried by the leaf spring contact. The non-conductive spacer has an aperture allowing the protruding terminal to contact the leaf spring contact while preventing a flat terminal of the battery from contacting the leaf spring contact.

In another aspect of the invention a reverse polarity protection assembly comprises an electronic product housing having a battery compartment having a recessed positive contact and recessed negative contact. The assembly further comprises a battery holder carried within the battery compartment. The battery holder has a plurality of leaf spring contacts biased towards each other at opposing ends of the battery holder, the battery holder having external battery contacts to contact the recessed positive and negative contacts. The assembly finally comprises a plurality of non-conductive spacers carried by at least some of the leaf spring contacts, each of the spacers have an aperture allowing a protruding terminal of a battery to contact the leaf spring contact and preventing a flat terminal of a battery from contacting the leaf spring contact.

DETAILED DESCRIPTION OF THE PREFERRED EMBODIMENT

Figure 1:
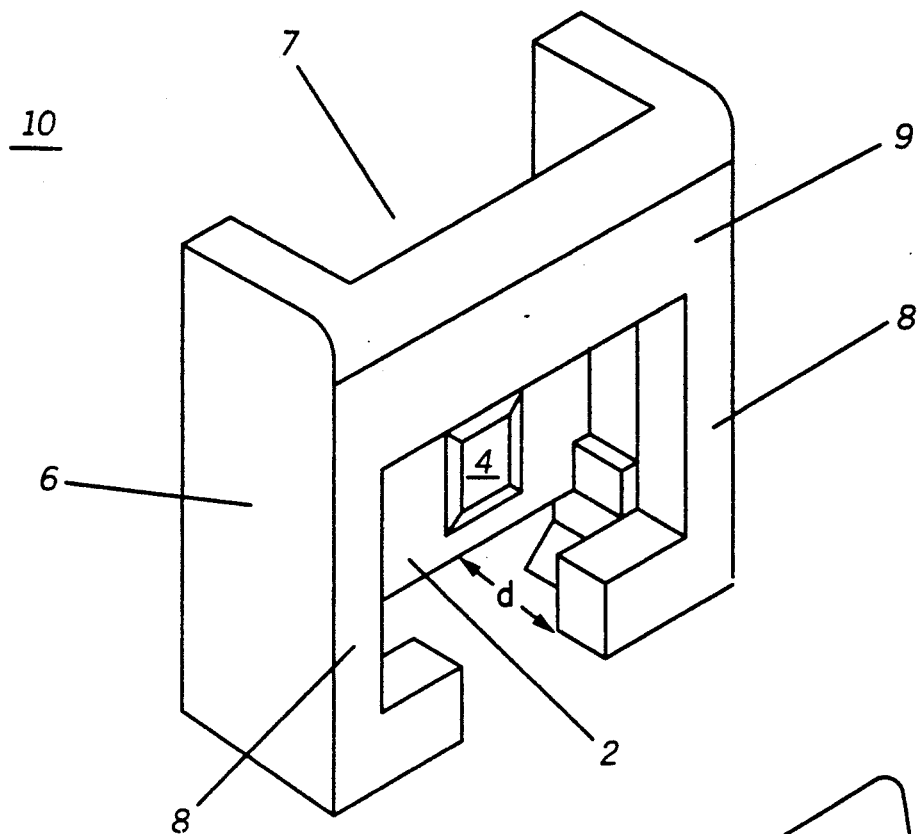
FIG. 1 is a perspective view of a contact spacer in accordance with the present invention.
Figure 2:
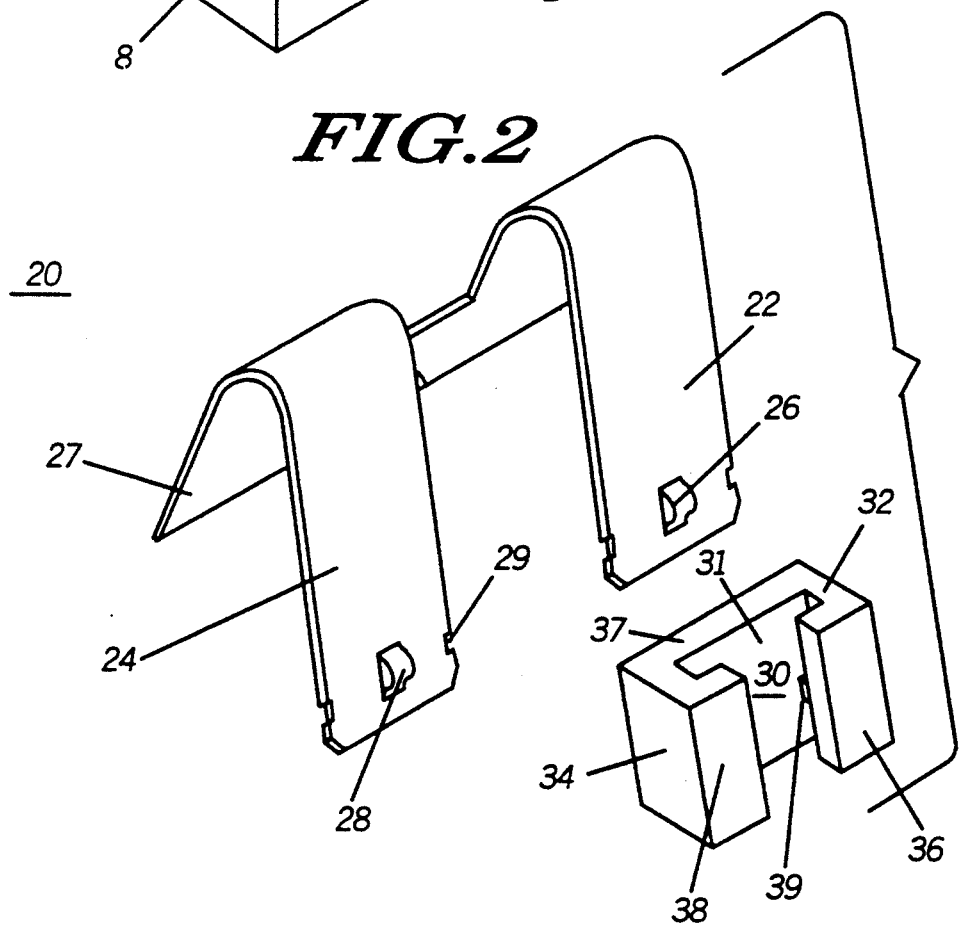
FIG. 2 is a perspective view of a spring leaf contact in accordance with the present invention.

Referring to FIGS. 1 and 2, there are shown perspective views of two non-conductive spacers 10 and 30 that could be placed on a leaf spring contact 20 in accordance with the present invention. The spacer 10 or 30, preferably made of non-conductive materials such as plastic or rubber serves the purpose of allowing the protruding terminal portion of a typical consumer battery or cell to contact the leaf spring contact 20 while preventing the flat terminal portion of a battery from contacting the leaf spring contact 20. The spacer 10 is preferably constructed to have a side wall 6 and an aperture 7 having a width "d" formed between the vertical beams 8 and the rear bracket 2. The horizontal beam 9 is also the same distance "d" from the bracket 2. Optionally, the bracket 2 has dimple 4 serving as a locking feature for mating with a dimple 26 or 28 on the leaf spring contact. The spacer 10 would slip on to the either leaf spring members or portions 22 or 24 of the contact 20. Alternatively, the another spacer 30, having a rear wall 37, front walls 38 and 36, and side walls 32 and 34 slips onto the leaf spring portion (either 22 or 24) of the contact 20 via the aperture 31. The spacer 30 would lock on to the leaf spring portions using a locking feature 39 which mates with a notch 29 on the leaf spring portion. The leaf spring contact 20 could thus carry either spacer 10 or 30 using two different locking mechanisms. The leaf spring contact 20, also include a rear wall portion 27 for insertion into a housing or in this case a battery holder housing.

Figure 3:
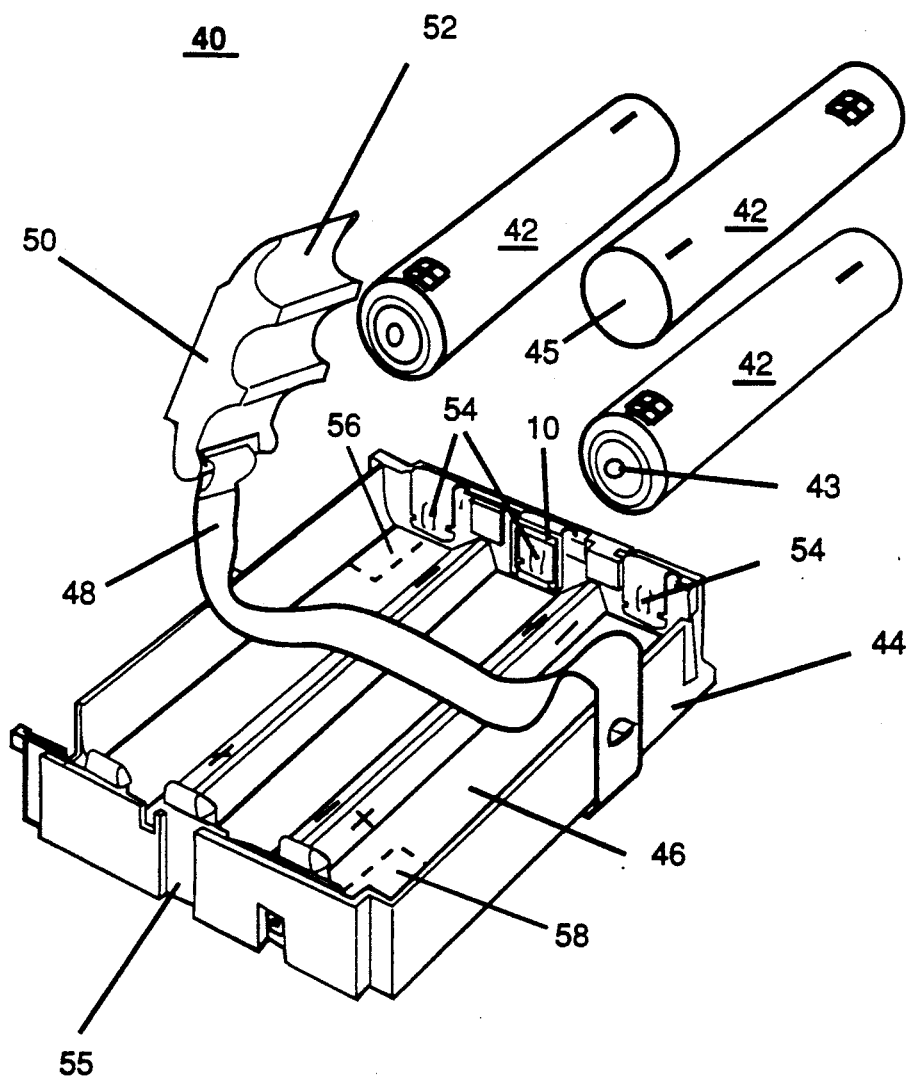
FIG. 3 is a perspective view of a battery holder and assembly in accordance with the present invention.
Figure 6:
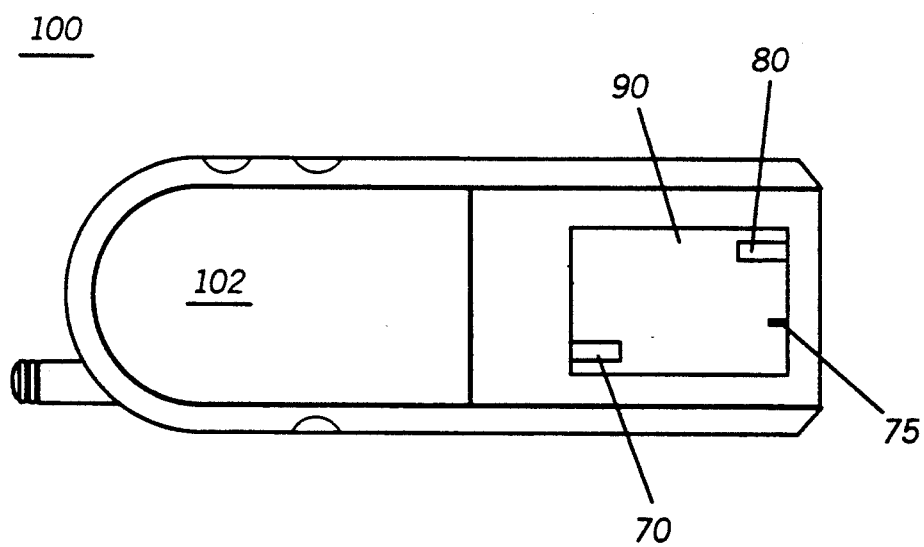
FIG. 6 is a perspective view of a radio having a battery compartment in accordance with the present invention.

Referring to FIG. 3, there is shown a battery holder assembly 40 preferably comprising a battery holder frame 44 preferably made of plastic or other non-conductive material. The frame 44 has recesses 46 for preferably carrying consumer batteries or cells 42 having a flat terminal 45 (usual negative) and a protruding terminal 43 (usually positive). The frame carries a plurality of contacts 54 that are located at opposing ends of the frame. At least some of the contacts 54 carry the spacer 10 to provide reverse polarity protection. The spacer 10 allows the protruding portion 43 of the battery 42 to contact the contact 54, while preventing the flat portion 45 of the battery from contacting the contact 54. Assuming the batteries have a protruding portion being positive as shown, then an external contact 56 serves as the external negative contact and the external contact 58 serves as the positive external contact. Referring to FIG. 6, the external contacts 56 and 58 would mate with contacts 80 and 70 respectively of a radio 100. The radio 100 preferably comprises a housing 102 having a recessed battery compartment 90 which carries the battery holder assembly 40. The battery holder frame 40 would also include a keying feature 55 to mate with the protruding feature 75 in the battery compartment 90 to prevent the inappropriate insertion of the battery holder assembly 40 into the compartment 90.

Figure 4:
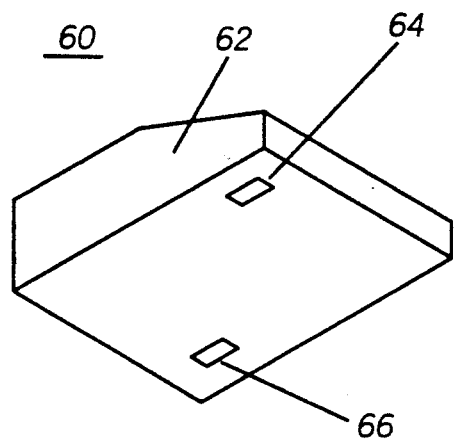
FIG. 4 is a bottom perspective view of rechargeable battery pack in accordance with the present invention.
Figure 5:
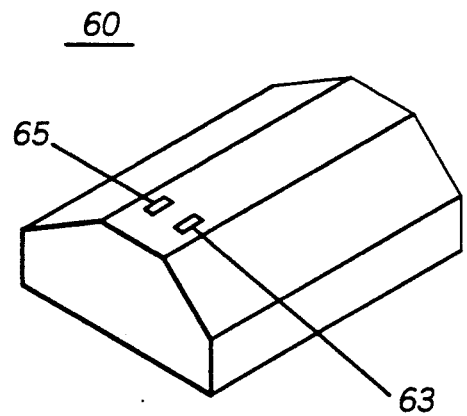
FIG. 5 is a top perspective view of rechargeable battery pack in accordance with the present invention.

Referring to FIGS. 4 and 5 there is shown bottom and top perspective views respectively of a rechargeably battery pack 60 for insertion into the battery compartment 90 of radio 100. In FIG. 4, the bottom perspective view reveals a battery housing 62 having battery contacts 64 and 66 for mating with battery contacts 70 and 80 respectively in the battery compartment 90 of the radio 100. The top perspective view of FIG. 5 shows the charger contacts 63 and 65 of the rechargeable battery 60. The rechargeable battery 60 can then be charged as is conventionally known.

In operation, a user of radio 100 could power the device with either the rechargeable battery pack 60 or with the battery holder assembly 40 with consumer type batteries (42) inserted in place. The rechargeable battery pack 60 will likely have a larger dimension in height than the battery holder assembly 40 including the batteries (42). Therefore, in order to maintain a tight fit within the radio housing 62, a spacer 50, preferably coutoured (42) to mount on top of the cylindrical batteries as shown could make up the difference in height between the rechargeable battery pack 60 and the battery holder assembly 40. The spacer 50 is attached to the battery holder frame 44 via a ribbon 48. The ribbon 48 and spacer 50 in combination can serve several purposes. The ribbon 48 allows for the easy removal of the batteries 42 if the batteries are placed on top of the ribbon in the battery holder frame 44. The ribbon and spacer further allows the user to pull out the entire assembly 40 from the compartment 90 after it has been inserted. This facilitates the replacement of new cells in the battery frame assembly 40 or the replacement of the assembly 40 with a rechargeable battery pack 60.

What is claimed is:

1. A battery contact having reverse polarity protection for an electronic product for preventing the improper insertion of a battery having a protruding terminal on one end and a flat opposing terminal on the other end, comprising:
   a leaf spring contact having a locking feature for engaging said protruding terminal; and
   a non-conductive spacer carried by the leaf spring contact having an aperture allowing the protruding terminal to contact said leaf spring contact and preventing said flat terminal from contacting said leaf spring contact, said spacer having a locking feature for mating with said locking feature on the leaf spring contact.

2. The battery contact of claim 1, wherein said spacer is color coded to provide an ergonomic indication for contact with the protruding terminal of the battery.

3. The battery contact of claim 1, wherein said spacer surrounds a substantial portion of the periphery of said leaf spring contact.

4. The battery contact of claim 1, wherein said spacer has a dimple feature for mating with a dimple feature on the leaf spring contact.

5. A battery contact having reverse polarity protection for an electronic product for preventing the improper insertion of a battery having a protruding terminal on one end and a flat opposing terminal on the other end, comprising:
   a leaf spring contact for engaging said protruding terminal, said leaf spring contact having a leaf spring portion with a locking feature; and
   a non-conductive spacer carried on a substantial portion of the periphery of the leaf spring portion, said spacer having a locking feature for mating with said locking feature on the leaf spring portion and said spacer having an aperture allowing the protruding terminal to contact said leaf spring portion and preventing said flat terminal from contacting said leaf spring contact.

6. The battery contact of claim 5, wherein said spacer is color coded to provide an ergonomic indication for contact with the protruding terminal of the battery.

7. The battery contact of claim 5, wherein said spacer has a dimple feature for mating with a dimple feature on the leaf spring contact.

8. A mechanical reverse polarity protection assembly, comprising:
   an electronic product housing having a battery compartment having a recessed positive contact and recessed negative contact;
   a battery holder carried within said battery compartment having a plurality of leaf spring contacts biased towards each other at opposing ends of said battery holder, said battery holder having external battery contacts to contact said recessed positive and negative contacts; and
   a plurality of non-conductive spacers carried by at least some of said leaf spring contacts, each said spacer having a locking feature for locking the spacer to the leaf spring contacts and each said spacer having an aperture allowing a protruding terminal of a battery to contact said leaf spring contact and preventing a flat terminal of a battery from contacting said leaf spring contact.

9. The mechanical reverse polarity protection assembly of claim 8, wherein said battery holder includes keying features for prevention of reversed insertion of said battery holder into said battery compartment.

10. The mechanical reverse polarity protection assembly of claim 8, wherein said spacer is color coded to provide an ergonomic indication for contact with the protruding terminal of the battery.

11. The mechanical reverse polarity protection assembly of claim 8, wherein said spacer surrounds a substantial portion of the periphery of said leaf spring contact.

12. The mechanical reverse polarity protection assembly of claim 5, wherein said spacer has a dimple feature for mating with a dimple feature on the leaf spring contact.

13. The mechanical reverse polarity protection assembly of claim 8, wherein said assembly further comprises a ribbon and battery retainer feature, comprising:
   a ribbon having one end coupled to a first side of said battery holder;
   a battery retainer coupled to a second end of said ribbon and contoured to fit over a cylindrical battery, said battery retainer feature provides for the easy removal of the battery and the battery holder.

14. The mechanical reverse polarity protection assembly of claim 13, wherein said battery retainer further serves as a spacer to hold the battery tightly in the holder and to lock the holder in the battery compartment.

15. The mechanical reverse polarity protection assembly of claim 8, wherein said battery holder holds non-rechargeable batteries.

16. The mechanical reverse polarity protection assembly of claim 8, wherein said battery holder is selectively removable from said battery compartment to allow the insertion of a rechargeable battery into the battery compartment.

* * * * *